April 29, 1958     J. R. ROBERTS ET AL     2,832,765
EXTRACTION METHOD

Filed June 14, 1955     3 Sheets-Sheet 1

JAMES R. ROBERTS & ARTHUR S. GREGORY
Inventors
By Leslie G. Noller
Attorney

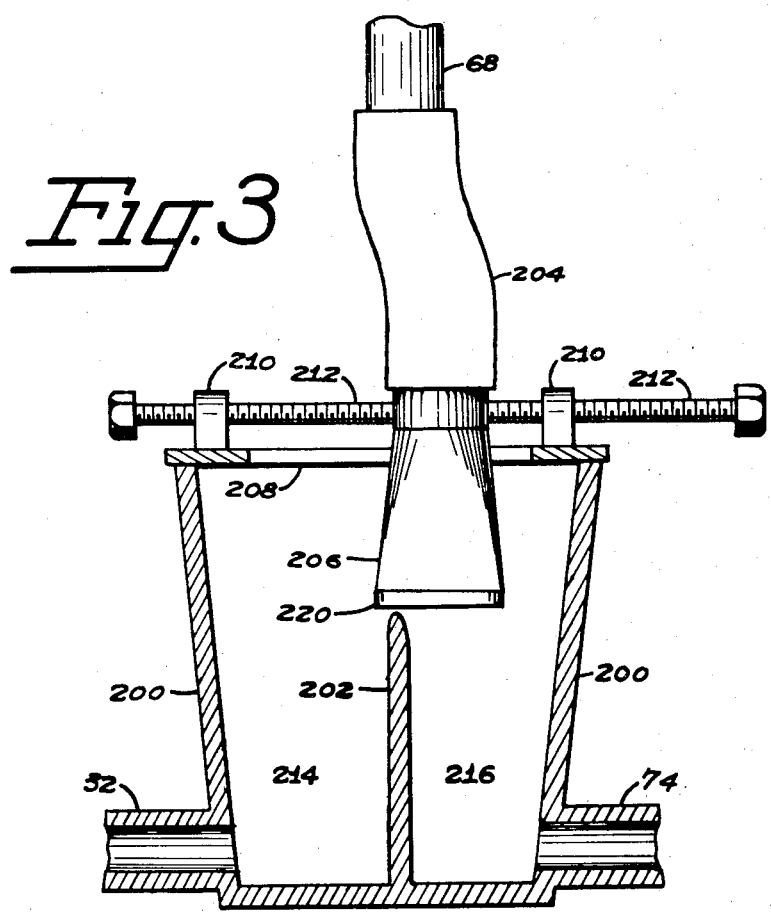

United States Patent Office 2,832,765
Patented Apr. 29, 1958

2,832,765

EXTRACTION METHOD

James R. Roberts and Arthur S. Gregory, Longview, Wash., assignors to Weyerhaeuser Timber Company, Tacoma, Wash., a corporation of Washington Application June 14, 1955, Serial No. 515,424

6 Claims. (Cl. 260—209)

This invention relates to a process for treating solids with liquids for the purpose of extracting soluble components from solid materials of vegetable origin, particularly the extraction of water soluble components from the barks of trees by means of an aqueous solvent.

The economic practice of the extraction process which involves the recovery of valuable soluble materials from solid substances, such as the barks of trees, is replete with technical problems. Of primary consideration is the fact that the dissolution of the soluble components in the bark is not effected immediately by contact of the solvent with the bark material. This is due in part to the fact that certain hydrolytic reactions must probably take place before the solution process can be asserted. Furthermor, the migration of the solvent into the bark matrix and the migration of the solution of solvent and soluble components out of the bark matrix are both time-consuming steps. Consequently, the usual experience is that for maximum extraction it is necessary to retain a given unit of the bark in contact with the extracting liquid for a substantial contact period. It is generally necessary to increase the temperature of the extraction liquid which, together with the long time of contact, produces detrimental effects such as the insolubilization of the extract at practical concentrations. Reduction of the contact time of the solid with the extraction liquid to avoid these effects results in a product which is so dilute that it is uneconomical to process it for the recovery of the solute. An added influencing factor is that, due to the physical structure of the bark, there is a tendency for relatively concentrated solutions to become and remain associated with the bark. This greatly limits the amount of soluble material which may be extracted. When elevated temperatures are employed in order to accelerate the extraction of the solubles, some of the soluble components which are extracted condense or otherwise polymerize forming insoluble substances having greatly reduced utility. This phenomenon is particularly apparent in the case of phenolics extracted from the bark of trees.

It is for these reasons, among others, that many solid materials, particularly those of vegetable origin such as bark, have not been separated into their valuable chemical components on a commercial basis by use of aqueous solvents. Rather, the trend has been toward the use of special sequences of different and expensive organic solvents which are difficult and costly to purify and recover for re-use, and which generally introduce hazardous conditions which are subject to costly controls. It has now been discovered that recourse to the use of organic solvents for the extraction of valuable materials from solids, particularly those of vegetable origin, such as the barks of trees, may be avoided and that the above and other difficulties associated with the aqueous phase extraction of soluble materials from such solids may be overcome in an efficient and economical manner by means of a particular countercurrent extraction method hereinafter described.

It is the principal object of this invention to provide a method whereby solid substances, particularly substances of vegetable origin such as the bark of trees, wood, agricultural residue and weed substances, may be economically extracted with liquids to yield valuable chemical products. Another object of this invention is to provide a method of extracting valuable soluble components from solid substances such as solid materials of vegetable origin and particularly the bark of trees, which method is continuous and flexible in operation and removes a maximum amount of soluble material from the parent stock, provides a maximum concentration of dissolved material in the extract and substantially avoids secondary and/or side reactions.

Various other and ancillary objects and advantages of the present invention will become apparent in the following description and explanation of the invention as it is set forth with reference to the particularly described modifications of the method and the apparatus employed, as illustrated in the accompanying drawing.

In the extraction method of this invention solid material of vegetable origin is first contacted in an extraction cell with rich extraction liquid which contains extracted solubles from previous extraction stages wherein the partially extracted solid material has been countercurrently contacted with the extraction liquid. The contact of the solid material to be extracted and the extraction liquid in the rich extraction cell is carried out under controlled conditions of temperature, time and particle size. Following the treatment of the solid in the rich extraction cell the phases are completely separated and the extracted solid is submitted to repeated countercurrent washings accompanied by phase separation at each washing stage whereby a substantial amount of dissolved material occluded on the solid is removed. The liquid removed by the phase separation immediately following the rich extraction cell may be divided into two parts having predetermined relative volumes. One of these may be returned to the rich extraction cell to be contacted with additional newly added solid material, and the other passed onto and through the solid material phase separated from the rich extraction cell liquid, for removal of fine suspended solids. It may then be collected as the final product, or the entire amount of the liquid from the rich extratcion cell may be collected as the final product. The partially extracted solid material then passes through a number of countercurrent washings or is otherwise countercurrently contacted with lean extraction liquid, and after the last of these washings or other treatments the partially extracted solid material is transferred to a second or lean extraction cell of larger capacity than the first-mentioned rich one where it is contacted with the most dilute solution of extraction liquid in the system. Conditions of temperature, contact time and stirring in this second extraction cell may be the same or different from those obtaining in the first extraction cell. The slurry of solid and lean extraction liquid is removed from the second extraction cell to a second phase separator where its phases are completely separated. The separated extraction liquid from this second phase separator is also divided into two parts having predetermined relative volumes. One of these may be collected as additional final product, ultimately to be mixed with the rich extract, and the other may be again divided, one part being used for washing the solid cake on the first phase separator and the other for mixing with the extraction liquid of the second extraction cell. The preferred method is, however, to omit the collection of lean extract as a product and proceed with the division into two parts, one for recycling to the lean extraction cell and one for washing at the first phase separator. The separated solid phase on the second phase separator is washed with newly added solvent for the purpose of removing all occluded material. This last-mentioned wash liquid is then delivered to the second extraction cell as the main portion of the extraction liquid of that cell. The solid phase from the second phase separator constitutes the completely extracted solid phase and is collected as a final product.

The required sequence of steps in accordance with the above outline may be carried out either batch-wise or continuously, the continuous method being preferred. When the continuous modification is employed, it is possible to vary the dependent variables of contact time and retention time by changing the settings of the independent variables upon which they depend. Thus, the dimensions of the two extraction cells and/or the amount of extraction liquid continuously recycled to each cell may be changed. In general, the invention contemplates the use as the first or rich extraction cell of a relatively small vessel in order to reduce the contact time of the solute-rich solid and the retention time of the enriched extract liquid, and to use as a second extraction cell a vessel which is relatively large in comparison with the first one, generally in the proportion of from 3:1 to 5:1 volumes, in order to prolong the contact time of the solute-poor solid and the retention time of the newly added or lean extract liquid, thereby minimizing the physical and chemical reactions involving the solute and the solid in the first cell but regaining the efficiency of the extraction in the second extraction cell. It is preferable to recycle a major portion of the liquids removed from the phase separator to a cell of origin in order to increase the retention time to a value substantially greater than the contact time and, thus, to increase the concentration of dissolved solids in the extract.

The terms "contact time" and "retention time," as used herein, may be defined as follows: Contact time is the average time that the material being extracted, such as bark particles, remains in the extraction cell. Retention time is the average length of time that the extracting media, such as water or extraction liquid containing some extracted solubles, spends in the extraction cell before it leaves the system. Both contact time and retention time, as indicated above, are dependent variables, as are also the extract concentration and consistency in each of the extraction cells. The values placed on these dependent variables are controlled by the selected bark feed rate, water feed rate, cell temperatures, cell volumes and recycle rate to each cell. If the feed rates are held constant, the cell volume fixed, and no recycle employed, then the consistency is controlled by the ratio of feeds. This also controls contact and retention times and the ratio of the one to the other. When recycling is introduced, flexibility of contact time and consistency is also introduced. At a high recycle rate the flow of liquid from the cells is increased so that the solid particles are washed out of the cells. The liquid returned to each cell gets repeated exposure to solids while contact time and consistency are reduced. By utilizing different amounts of recycle for the respective cells, the contact time in each cell can be independently controlled. When the cell volume, evaporation and solid feed are constant, the rate at which the liquid enters and leaves the system controls the retention time. The extract liquid enters as water feed or dilute extract liquid, and such moisture as may be contained in the solid. It leaves the system as extract, evaporation and such moisture as is retained in the extracted solid residue.

By using a small rich extraction cell, a short retention of rich extract is accomplished by means of which fresh bark is partially extracted rapidly with a short contact time. The extract concentration is thus built up with a minimum loss of solubles due to condensation and adsorption which takes place under long retention and contact times. Complete phase separation and washing with the lean extract between the cells prevents the rich extract from working back into the lean cell with the solids. Consequently, when partially extracted bark, washed free of occluded rich extract, enters the lean cell, it can stay in the lean extract environment for a longer contact time enabling completion of extraction.

In the co-pending application of Clark C. Heritage, Serial No. 463,791, filed October 21, 1954, there is described a process for the extraction of soluble components from solids by (1) mixing the solid to be extracted with extraction liquid rich in extracted solubles in a rich extraction cell; (2) phase separating the resulting slurry; (3) proportioning the separated rich extraction liquid and recycling one part to the rich extraction cell and collecting the other as a final product; (4) washing the partially extracted solid of said slurry in a number of successive stages on a continuous phase separator or mixing it successively in a series of extraction cells countercurrently with the extraction liquid of decreasing extract solubles content; (5) phase separating the solid from the extraction liquid at or after each stage; (6) using the separated liquid as wash or extraction liquid for the next stage countercurrent to the flow of solid; and (7) using the separated liquid from the last washing or mixing stage as the primary extraction liquid in the rich extraction cell.

It has been found that a higher recovery of solubles at higher concentration with fewer extraction stages can be obtained by the method herein described which constitutes an improvement over that of the said co-pending application.

The process of this invention is now described with particular reference to the extraction of the barks of trees with substantially inert liquids, particularly water and aqueous solutions. In view of the prevailing practice of barking all logs utilized in sawmills and the necessity for the removal of bark in plywood and pulp mills prior to peeling or chipping, tree barks are available as a residual or by-product in large quantities at all types of log processing plants. In the case of Douglas fir, the bark represents up to one-sixth of the volume of the log and, although there is a substantial market for some physically separated components of the bark, the principal use of this volume of by-product is as fuel, a use to which it is poorly adapted. These tree barks of limited utility contain substantial quantities of chemical substances whose value far exceeds the fuel value of the bark. The Douglas fir bark, for instance, contains approximately 10% of substances which may be removed by treatment with hot water; such substances include dihydroquercetin, phenolics of proven high quality, and a mixture of carbohydrate materials. The bark of a variety of tree species is suitable for employment as raw material in carrying out the present invention. The trees may be either coniferous or deciduous, such as ponderosa pine, Douglas fir, hemlocks, spruces, other firs, redwood, larch and aspen. In addition to the barks of trees, principally considered herein, other substances to which this extraction process is applicable include sawdust or other forms of comminuted wood of various species of trees, ground corncobs, or other agricultural refuse, ground stems, leaves or roots of vegetable material, the seeds of plants, the pits of fruit, the shells of nuts, and vegetable material modified by natural or induced treatment with microorganisms.

This extraction method may also be applied to components of physically fractionated bark, as well as whole bark. For example, Douglas fir bark comprises approximately 25% of a cork-like substance, approximately 45% of bast fibers, and approximately 35% of highly friable parenchyma tissue. By a process of controlled comminuting and size separations under controlled conditions of moisture, Douglas fir bark may be fractionated to yield products which are rich in one of these three basic components. The bast fiber or sclerenchyma fraction is very poor in soluble extractives and, hence, may not be a desirable raw material for extraction. The cork fraction, however, is particularly rich in dihydroquercetin and the wax-like high molecular weight fatty acids and aliphatic alcohols. The parenchyma fraction is particularly rich in the phenolic acids. Thus, the yield of a particularly desired product of the extraction may be substantially increased if these bark fractions are separately extracted.

The improved extraction process of this invention as particularly applied to the extraction of soluble materials from the barks of trees may best be described with reference to the accompanying drawings in which:

Figure 3 is a detail part sectional view of a proportioning mechanism shown as an element in the schematic diagram of Figure 1.

Figure 1:
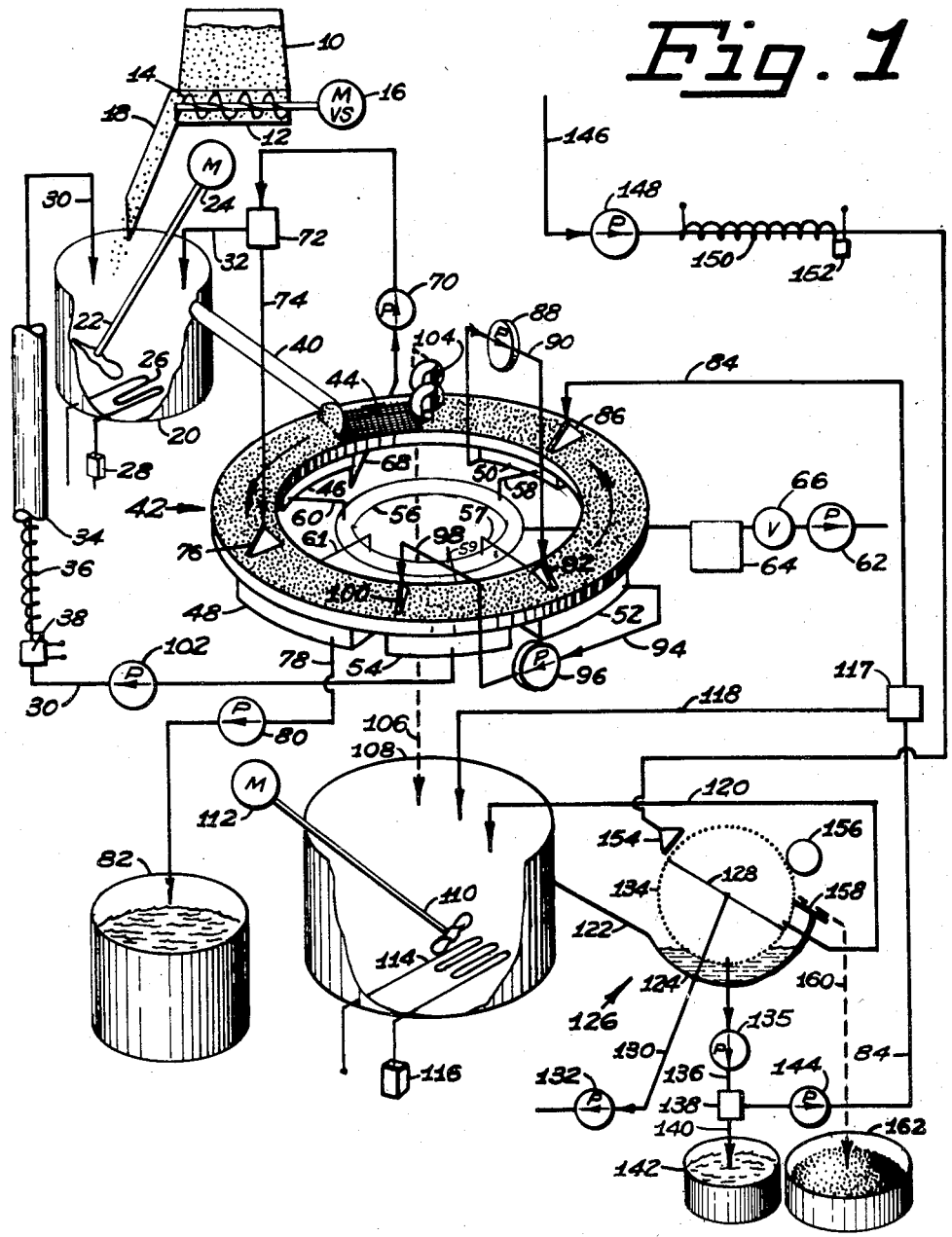
Figure 1 is a schematic diagram showing the arrangement of apparatus and flow of materials.

With particular reference to Figure 1, the bark is first reduced to a finely divided form in order to increase the specific surface and decrease the linear distances between the particle surfaces and interior of the particles, thus enhancing the speed of extraction. The bark should have a moisture content of not over 60% and preferably less than 45% by weight. It is reduced in a hammermill or other similar comminuting device until the particle size is of the order which will pass a 30-mesh screen of the U. S. sieve series. Preferably it is ground to 20% maximum on a 20-mesh screen while keeping the fines to 35% maximum through a 150-mesh screen. Due to the fact that the greatly increased specific surface of the ground product accelerates the normal deteriorating processes, the bark is ground just prior to extraction. The freshly ground bark is introduced into a hopper 10 having a trough bottom 12 fitted with a feed screw 14 which is rotated by variable speed motor 16. A continuous uniform flow of bark is delivered through conveyor 18 into extract-rich cell 20 which is equipped with stirring means 22 powered by motor 24 and temperature regulating means 26 controlled by thermostat 28.

Extract liquid for contact with the ground bark is continuously introduced into cell 20 through line 30 which delivers the primary extraction fluid and line 32 which delivers recycled extraction liquid from cell 20. Both of these lines 30 and 32 may be lagged as with insulating material 34 and heated by means such as the heating coil 36 controlled by a thermostat 38. By regulating the proportions of bark fed into cell 20 and of extracting liquor delivered through conduits 30 and 32, the consistency of the slurry within the cell may be controlled within any practical limit. The selected limitation of consistency should permit the maximum quantity of bark to be treated per unit of time while maintaining an effective extraction potential of the liquid and sufficient fluidity of the mixture in the cell to permit relative movement between phases.

Cell 20 may be of any desired type of construction, but it is preferably of vertical cylindrical shape in order to minimize the formation of static pockets in the slurry as a result of eddies produced by the stirrer. The latter may be substituted by baffles and impeller means to prevent short-circuiting of the solids. In this cell solubles-rich bark is contacted with relatively concentrated extract. The cell is relatively small dimensionally in order to insure that the average retention time is brief. The stirrer or impeller for agitation of the slurry should be so operated that a minimum of aeration results from its action. In the extraction of Douglas fir bark the extraction temperature in this cell is kept just below the boiling point by regulation of the heating means 26. This temperature may be varied within wide limits depending on the character of the solid being extracted and the extraction liquid.

The ground bark and extraction liquid forms a uniformly mixed slurry as a result of the continuous agitation in cell 20, and this slurry overflows continuously into condut 40 which discharges the slurry onto an annular surface of a ring-type pan phase separator 42. Phase separation at this point of the procedure may be effected by means of any other desired type of continuous phase separator capable of countercurrent washing, such as a drum filter, a vibrating screen or series of vibrating screens, or a centrifuge. Applicants have found that the horizontal pan vacuum filter of the type manufactured by Oliver is most satisfactory. The horizontal surface of this preferred type of phase separator comprises a fine mesh filtering screen 44 which covers a plurality of spaced suction boxes such as the five illustrated at 46, 48, 50, 52 and 54. Air is exhausted from these suction boxes by means of vacuum pump 62 operating through surge vessel 64, manifold 56 and collecting lines 57, 58, 59, 60 and 61. The degree of suction may be regulated by means of regulating device 66. The filtering surface or screen 44 of the phase separator 42 rotates about a vertical axis in a counterclockwise direction. The slurry of bark and rich extract delivered from cell 20 through conduit 40 onto filtering screen 44 is immediately filtered, all but the finest solids being retained on screen 44, and the extract passing into suction box 46. This extract is removed from suction box 46 via line 68 by means of suction pump 70 which produces sufficient reduced pressure to permit the transfer of fluid from the reduced pressure zone in suction box 46 to a zone of atmospheric pressure. The extraction fluid thus withdrawn from suction box 46 is delivered by line 68 at atmospheric pressure to proportioner 72 where it is divided into two parts having predetermined relative volumes. One part of the divided stream is delivered from the proportioner 72 by line 32 to cell 20 for further contacting with freshly added ground bark whereby to increase the concentration of the dissolved substances in the extract liquor. The other stream from proportioner 72 is conducted through line 74 to sprayhead 76 which discharges said extract liquor as a spray on the bark cake advancing along the surface of the phase separator. This stream of extract passes through the bark cake into suction box 48 from which it is removed by suction pump 80 acting through line 78 and is discharged as a final product into receiver 82.

The filtering of the rich extract through the bark filter cake into suction box 48 prior to collecting it as a final product at 82 removes some finely divided solids from the extract liquor which may have passed through the wire mesh 44 of the phase separator, while the slurry delivered from the extraction cell through conveyor 40 was being initially filtered.

The phase separator 42 is the first phase separator encountered by the bark or other solid material in the direction of flow of the solid material through the system. It is on this phase separator that substantially all of the occluded solubles are removed from the solid material by a succession of countercurrent washings with extract liquid. To effect these successive washings dilute extract liquid is sprayed onto the filter cake through sprayhead 86 located at a point above the plane of the phase separator 42 just ahead of the point of removal of the partially extracted solid from the said phase separator. The dilute extract liquid introduced at this point passes through the filter cake into suction box 50 from which it is continuously removed by the assistance of suction pump 88 and delivered by line 90 to sprayhead 92 which sprays the bark cake at a point intermediate the point of removal of the bark from the phase separator and the point of entrance thereto. This washing process is repeated as many times as desired throughout the travel of the solid material along the surface of the annular phase separator. Three such washings are illustrated in the drawing, the final one being effected by removing the extract liquor pouring through the filter cake from sprayhead 92 into suction box 52 by line 94 and suction pump 96 which delivers it to line 98 for discharge onto the bark cake through sprayhead 100. The wash or extract liquid from the final washing passing into suction box 54 is removed by sutcion pump 102 and delivered to the first or rich extraction cell as the primary source of extraction liquid for that cell. As the extract liquid advances through the plurality of washings from its entrance at 86 through its delivery to line 30, it becomes increasingly more concentrated with bark solubles due to its countercurrent contact with bark from which it removes greater amounts of occluded solubles the closer the point of contact is to the entrance of the bark into the phase separator. It is noted that all of the extraction liquid which has been employed as wash water on the first phase separator is delivered to the rich cell where it is moxed with a predetermined fraction of the rich extract recycled from the rich cell through proportioner 72.

The bark residue remaining on the screen of the first phase separator 42 after having been relieved of substantially all of the occluded solubles still contains some extractable substances which have not been removed in the rich extraction cell. This bark residue is therefore removed from the phase separator screen 44 by augur 104 and is conveyed directly to a second extraction cell, the lean cell 108. Extracting liquid is delivered to the lean cell through lines 118 and 120. The mixture of bark residue and extracting liquor is stirred by means 110 powered by motor 112, and the temperature of the mixture is regulated by temperature regulating means 114 which is controlled by thermostat 116. The stirring means in this cell may also be substituted by an impeller and baffles type of agitator in order to prevent short-circuiting of the solids.

The lean cell 108 is of much larger capacity than the rich cell. The volume ratio of the lean cell to the rich cell may be as much as 5:1 or greater. In view of the fact that the bark in the lean cell is relatively poor in extractable solubles and the extract liquid is very dilute, there is little opportunity for mass action effects or secondary chemical or physical reactions to take place. Consequently, it is possible to conduct the extraction in the lean cell in such a manner that the contact and retention times are relatively long compared to those of the rich cell, which condition is fostered by the relatively large volume of the lean cell. Although not shown in the drawings, the lean cell optionally may be provided with means for adjusting the working volume of the cell to predetermined values. The temperature of the lean cell may be maintained at any desired level, although the preferred temperature for the extraction of Douglas fir bark is slightly less than the boiling point. Where higher temperatures are desired, the lean cell and its communicating parts may be so modified as to enclose them for operation at superatmospheric pressure and, therefore, at temperatures above the normal boiling point of the extracting liquid.

The slurry of bark residue and extracting liquid is continuously agitated in the lean cell 108 and continuously delivered through conduit 122 from the lean cell to a trough 124 serving a second phase separator 126. This second phase separator may be any type of filtering or centrifugal separator, or series of vibrating screens with washers. A ring-type screen phase separator such as element 42 of Figure 1 may very well be used. However, applicants have found that the lower cost type of phase separator shown at 126 is just as suitable for the second phase separation. This phase separator comprises a drum filter 134 containing a baffle means 128 separating it into two non-communicating halves, both of which are evacuated through line 130 by means of suction pump 132. The perforated drum filter 134 passes through the slurry of bark residue and extracting liquid collected in trough 124 in a clockwise direction. The liquid from the slurry is drawn into the interior of the filter drum from which it is removed by means of suction pump 135 and delivered to proportioner 138 through line 136. The solid forms a cake on the outer surface of the filter drum.

Proportioner 138 may divide the flow of extract into two streams having predetermined relative volumes. One portion may be collected in receiver 142 as a final product comprising dilute extract which may be mixed with the rich extract collected in receiver 82 or processed separately for recovery of extracted solubles. The second portion of dilute extract is conveyed by pump 144 through line 84. The proportioner 138 optionally is preferably by-passed and all of the extract liquor delivered directly from the interior of the drum filter 134 to line 84. In either case line 84 delivers the dilute extract liquid to proportioner 117 where it is divided into two predetermined portions, one of which is recycled through line 118 to lean cell 108 as part of the extraction liquid for the said lean cell. The other portion is delivered to sprayhead 86 as the initial washing liquid for the solid cake on the first phase separator as described above.

Water or other dilute extracting liquid is introduced to the system through line 146 and is metered continuously by adjustable pump 148. The liquid carried by line 148 is temperature adjusted by heating coil 150 controlled by thermostat 152. The water or other dilute extracting liquid is initially used as a final wash liquid for the solid cake on the second phase separator to which it is discharged as a spray through sprayhead 154. The liquid passing through the solid cake on the second phase separator is collected in the interior of the drum filter by means of a stationary dividing wall 128 about which the drum filter surface rotates, and delivered to conduit 120 through which it is pumped to the lean cell 108 as the primary extraction liquid for that cell. Any liquid still retained by the filter cake on phase separator 134 after it passes the washing area is expressed by compression roller 156 to the interior of the filter drum 134 where it combines with the main body of the wash liquid. The solid cake is then removed from the drum filter by means of doctor blade 158 and is transferred by conveying means 160 to a final solid product receiver 162.

Although various types of fluid-dividing mechanisms may be employed to effect the proportioning of the flow of liquids, such as cored valves and proportioning pumps, a particularly suitable type of proportioner which could perform this function is illustrated in Figure 3. This device comprises an outer container delineated by the walls 200, a top provided with a slot to receive the line carrying the liquid to be divided, and a bottom having integral therewith a wall 202 which extends upwardly to a point about midway between the top and bottom of the vessel, thus dividing the lower half of the vessel into two non-communicating parts 214 and 216. Lines 32 and 74 communicating respectively with sections 214 and 216 serve to discharge the two portions of the divided liquid from the proportioner to their designated destinations. Conduit 68 is connected to a nozzle 206 having an elongated orifice 220 by means of flexible coupling 204, and the position of the nozzle discharging the entering liquid with respect to the dividing wall 202 is adjustable by means of adjusting screw 212 cooperating with threaded collars 210. Liquid discharging uniformly along the length of nozzle orifice 220 is divided into two streams by partition 202, the relative volumes of the streams being determined by the adjusted position of the orifice 220 with respect to the partition. This adjustment is quickly made while the system is in operation and can be changed as desired to any predetermined division of the liquid ranging from 100% of the flow into chamber 214 to 100% of the flow into chamber 216.

Figure 2:
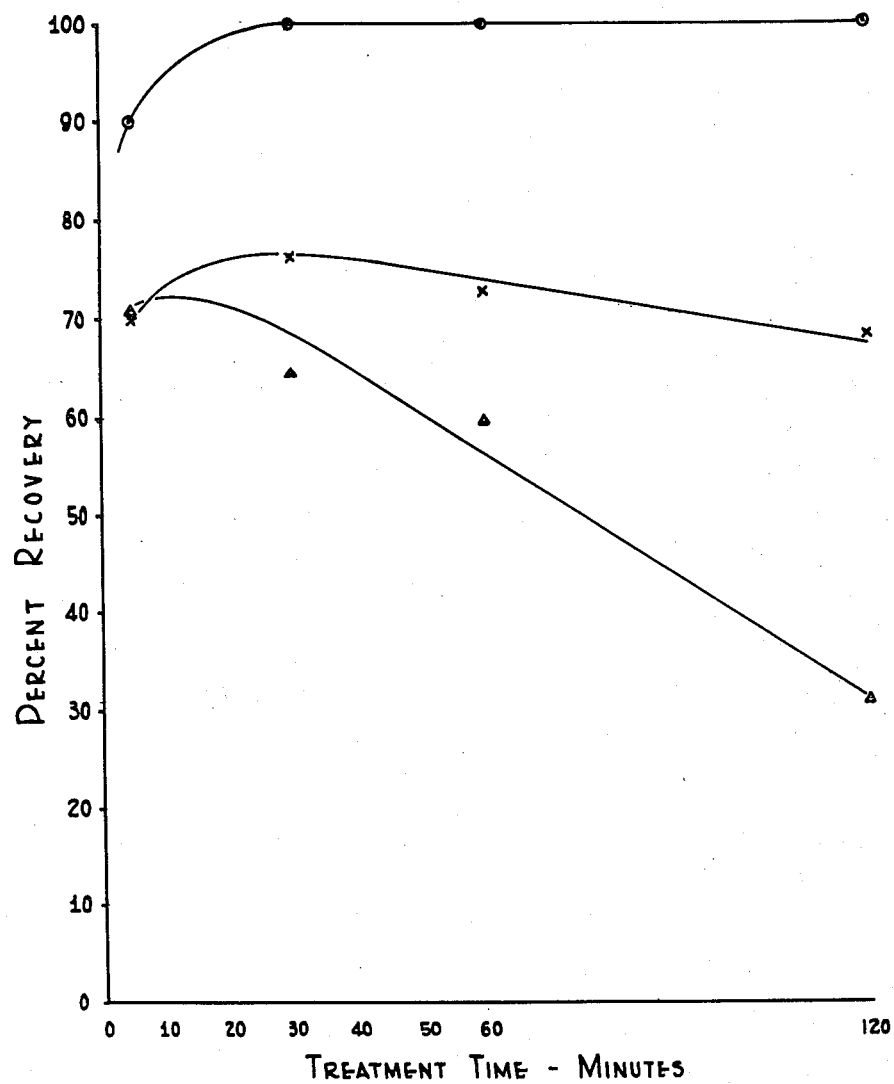
Figure 2 is a graph comprising three curves showing the rates of extraction of the bark solubles at aqueous extract concentrations of 0%, 4% and 6%, respectively.

The improved method of this invention provides for a short retention time of the rich extract in the rich extraction cell where the solid material comes in contact with concentrated extraction liquid. Thus, secondary reactions and other undesirable effects are minimized. Prolonged retention of the bark extract, for instance, in the form of a concentrated solution tends to produce chemical changes in the extracted phenolics. Also, if the concentrated solution of the bark extract is kept in contact with the bark material for any length of time, substantial amounts of the extracted solubles become occluded on or in the bark structure, and some extracted chemicals are selectively adsorbed by the bark. In effect, there are two competing physical or chemical reactions taking place in the rich extraction cell, the one removing solubles from the bark and the other removing solute from the solution. The undesirable flow of solute from the solution into the bark takes place to a greater extent as the extract concentration becomes greater and as the time of contact increases. This phenomenon is illustrated in the graph of Figure 2 where treatment time or contact time in minutes is plotted against the percent recovery of bark solubles. In this graph curve No. 1 represents a measured extraction of bark solubles by water at 100° C. Curve No. 2 shows the measured recovery at 100° C. using an aqueous extraction liquid having a bark solubles concentration of 3.63%. Curve No. 3 shows the measured recovery at 100° C. using an aqueous extraction liquid having a bark solubles concentration of 5.46%. These two last-mentioned curves show that instead of the yields approaching 100%, as in the case of the low concentration conditions of curve 1, the extract yields or recoveries decrease with time and approach zero. Thus, at high extract concentration such as represented in curve 3, the recovery falls off rapidly after about 10 minutes of contact, and although the rate of decrease in recovery at the somewhat lower extract concentration of about 3.6% shown in curve 2 is not as rapid as in the case of curve 3, it does fall off appreciably after 30 minutes' contact time.

This decrease in the rate of recovery or extraction manifests an increase in the rate of sorption of the extracted solubles by the bark residue at the higher extract concentrations. The difference in percent recovery between the horizontal or peak point of the curve and the point on the slope of the curve at a given time would represent the percent of extracted solubles sorbed by the bark.

The following is a tabulation of the experimental data from which these curves were derived. These experiments were on a batch operation basis at a temperature of 100° C.

TABLE I

*Percent recovery of Douglas fir bark solubles batch cooking at 100° C.*

| Extract Concentration | 5 Minutes | 30 Minutes | 60 Minutes | 120 Minutes |
|---|---|---|---|---|
| 0 | 90.0 | 100.0 | 100.0 | 100.0 |
| 3.63 | 70.0 | 76.4 | 72.7 | 68.2 |
| 5.46 | 70.9 | 64.6 | 59.9 | 30.9 |

The following detailed example will serve to more specifically illustrate the manner in which the extraction method of this invention, as described above and illustrated in the drawings, is carried out and the results which may be obtained from its operation relating to the extraction of a specific material. It is understood that this invention is not limited to the specific materials and conditions given in the example, and that no limitations are intended other than those particularly set forth in the subscribed claims.

EXAMPLE

The extraction material in this example is whole Douglas fir bark resulting from the hydraulic barking of saw logs and the extraction medium employed is water. The equipment employed to carry out the extraction is that which is described above and illustrated in Figure 1 of the drawings.

The moist Douglas fir bark was ground in a hammermill to a fineness of 30-mesh. This ground bark was added continuously at a uniform rate of 100 pounds of bark per hour on a dry basis. This bark had an initial solubles content of 10% and the moisture content was such that 40 pounds of water were added with each 100 pounds of dry bark. The ground bark was added to the rich extraction cell 20 which had an operating capacity of 21 gallons. The slurry of bark and extraction liquid in the cell was maintained at this volume continuously. The primary extraction liquid for the rich cell 20 was delivered through line 30 at the rate of 293 pounds of 3.75% extract per hour, furnishing 282 pounds of water and 11.0 pounds of dissolved solubles to the cell. Additional extracting liquid was recycled to the rich cell through line 32 at the rate of 267.0 pounds of 5% extract per hour, furnishing 253.7 pounds of water and 13.3 pounds of solubles. The ground bark and the mixture of the extraction liquids were stirred by an impeller type stirrer having its blades so adjusted as to provide the optimum amount of agitation with a minimum amount of aeration. The temperature in the cell was maintained at approximately 100° C.

The slurry of ground bark and extraction liquid was continuously removed from the rich cell at the rate of 700 pounds per hour comprising 94 pounds of bark residue, dry basis, 575.7 pounds of water and 30.3 pounds of dissolved solubles. This slurry was delivered to the surface of an Oliver vacuum pan filter operating at a reduced pressure of approximately 2 inches of mercury. The slurry was phase-separated on contact with the surface of the pan filter as it rotated in a counterclockwise direction over a series of vacuum pans. The filtrate collected in the first of this series of vacuum pans was sent to a proportioner 72 through line 68 at the rate of 387 pounds of 5% extract per hour. From the proportioner 70% of this extract liquid was recycled to the rich extraction cell from which it had been derived, thus accounting for the 267.0 pounds per hour of extract liquid delivered through line 32. The remaining 120 pounds per hour of 5% extract was delivered from the proportioner to sprayhead 76 from which it was sprayed onto and suction-filtered through the bark solids cake into vacuum pan 48 from which it was removed to receiver 82 as a final extract liquid containing 5% of dissolved solubles. As the bark solids cake was carried along in counterclockwise direction on the surface of the vacuum pan filter it was washed three times in series relationship with dilute extract liquid added initially through line 84 and removed from this phase of the operation through line 30. As added through line 84 the wash liquor consisted of 293.0 pounds per hour of 1.57% extract. As removed through line 30 this wash liquor consisted of 293.0 pounds per hour of 3.75% extract. Accordingly, the washing procedure removed 6.4 pounds per hour of occluded and retained solubles from the solids cake during the course of the washing procedure on this phase separator.

After a final washing at spray 86 and vacuum station 50 the bark residue and retained extract was removed from the surface of the phase separator by auger 104 and delivered to the lean extraction cell 108 at the rate of 313.0 pounds per hour. The composition of the bark residue at this point was 94.0 pounds per hour O. D. of partially extracted bark containing 4.25% of solubles on a total dry basis and solution consisting of 214.4 pounds per hour of water and 4.6 pounds per hour of dissolved material. The lean cell employed had an operating capacity of approximately 113 gallons, and the slurry of bark residue and extraction liquid was maintained continuously at that level. Again, stirring was effected in such a manner that optimum agitation and minimum aeration resulted. The temperature of the lean cell was maintained at approximately 100° C. The primary extraction liquid for this cell was continuously fed through line 120 at the rate of 461.7 pounds per hour of 0.55% extract, delivering 459.2 pounds per hour of water and 2.5 pounds per hour of solubles derived from the initial washing of the spent extracted solid on the phase separator 126.

A slurry consisting of 90.4 pounds per hour of bark residue and 849.5 pounds per hour of 1.57% of extract was continuously removed from the lean cell and delivered to the reservoir of a drum filter where a final phase separation was effected. The filtrate from this phase separation amounted to 638.6 pounds per hour of 1.57% extract. This filtrate was removed from the phase separator and delivered directly to proportioner 117 according to the preferred mode of operation. (In an alternative procedure the filtrate from the phase separator was delivered to proportioner 138 where it was divided, 180.4 pounds per hour being withdrawn and collected at 142 and 458.2 pounds per hour being delivered to proportioner 117.) The lean extract liquor was divided at 117 and approximately 65% was delivered through line 84 to the washing operation on the first-mentioned phase separator 42 and the remaining 35% was recycled through line 118 to the lean cell for mixture with the primary extraction liquid of that cell.

The bark cake on the drum filter 134 of phase separator 126 was washed with 386.5 pounds per hour of water. This wash water combined with the liquid expressed by roller 156 from the bark cake to produce 461.7 pounds per hour of 0.55% extract was delivered to the lean cell as the primary extraction liquid of that cell. The spent bark cake was removed from the drum filter 134 by means of doctor blade 158. The solids were removed at the rate of 226.0 pounds per hour and consisted of 90.4 pounds of bark residue on a dry basis and 135.6 pounds of 0.55% extract.

The lean extract collected at 142 and the rich extract collected at 82 were combined to produce 300.0 pounds per hour of 2.9% extract. This combination reduced the concentration of solubles in the rich extract, but made possible the incorporation of the lean extract into a final product having economically usable concentrations of solids.

The final extract liquid contained 88% of the available water-soluble constituents of the bark. The thus extracted water-soluble constituents separated from the extract liquor had the following composition:

1. Ether soluble chromans: Percent
   (a) Dihydroquercetin _____ 15.0
   (b) Other ether solubles _____ 5.0
2. Butanol soluble phenolics _____ 28.0
3. Lead salt insoluble organic acids _____ 32.0
4. Saccharides _____ 20.0

Having now described our invention and illustrated the best manner of performing it, what we desire to claim as new is:

1. The method of extracting soluble components from a solid material selected from the group consisting of bark, physical fractions of bark, and comminuted forms of wood with an aqueous extractant selected from the group consisting of water and water extract of bark solubles which comprises adding the solid material in comminuted form only to an extraction cell containing rich extraction liquid in a system of countercurrent extraction cells separated by phase separators, adding extraction liquid to the system in countercurrent flow to the solid material only at a point in the system where it is utilized as the primary source of extraction liquid for an extraction cell containing lean extraction liquid and partially extracted solid residue as the primary extraction liquid of that cell, recycling to the lean extraction cell as additional extraction liquid a proportioned part of the extraction liquid phase-separated from a slurry of the solid material and extraction liquid emanating from the lean cell, delivering another proportioned part of said extraction liquid to another phase separator, utilizing that portion as wash extract liquid for the extracted solid material as the latter advances along on the last-mentioned phase separator to a point at which it is removed and delivered to the lean extraction cell, collecting the wash extraction liquid from the last washing and delivering it to the rich extraction cell as the primary extraction liquid of that cell, intimately mixing the extraction liquid with the comminuted solid in said rich cell while stirring and maintaining the temperature of the resulting slurry at about the boiling point, removing the slurry of solid material and extraction liquid from the rich extraction cell after a contact time of from 10'-30', phase-separating the extracted solid material from the rich extraction cell on the last-mentioned phase separator, collecting the separated rich extraction liquid as a final extract product, washing the phase-separated extracted solid material while advancing it countercurrently to the flow of washing liquid, removing the washed solid from the phase separator and delivering it to the lean extraction cell where it is contacted with a greater volume of extraction liquid than in the rich extraction cell and is maintained in intimate contact therewith at a temperature of about the boiling point for a longer period of time in the range of from 30'-120' with continued stirring, removing a slurry of the extracted solid and extraction liquid from the lean cell and delivering it to the first mentioned phase separator.

2. The method of extracting soluble components from the bark of trees with an aqueous extractant selected from the group consisting of water and water extract of bark solubles which comprises adding the bark in comminuted form only to a final extraction cell containing rich extraction liquid in a system of countercurrent extraction cells separated by phase separators, adding an aqueous solution to the system in countercurrent flow to the bark material only in a phase-separating step where it is utilized as wash liquid for the spent bark material, phase-separating the wash extraction liquid from the spent solid, delivering the separated wash extraction liquid to a lean extraction cell as the primary extraction liquid of that cell, recycling to the lean extraction cell as additional extraction liquid a proportioned part of the extraction liquid phase-separated from a slurry of the solid material and extraction liquid emanating from the lean cell, delivering another proportioned part of said extraction liquid to another phase separator utilizing that portion as wash extraction liquid in a washing of the extracted bark as the latter advances along on the last-mentioned phase separator to a point at which it is removed and delivered to the lean extraction cell, collecting the wash extraction liquid from the washing step and delivering it to the rich extraction cell as the primary extraction liquid of that cell, intimately mixing the extraction liquid with the comminuted bark material in said rich cell while stirring and maintaining the temperature of the resulting slurry at about the boiling point, removing the slurry of solid material and extraction liquid from the rich extraction cell after a contact time of from 10'-30', phase-separating the extracted bark from the rich extraction liquid on the last-mentioned phase separator, recycling a proportioned part of the separated rich extraction liquid to the rich extraction cell for mixing with further amounts of finely comminuted bark material and collecting the remainder of the extraction liquid as a final extract product, advancing the phase-separated extracted bark material through the washing mentioned above countercurrently to the flow of washing liquid, removing the washed bark from the phase separator and delivering it to the lean extraction cell where it is contacted with a greater volume of extraction liquid than in the rich extraction cell and is maintained in intimate contact therewith at a temperature of about the boiling point for a longer period of time than in the rich extraction cell in the range of from 30'-120' with continued stirring, removing a slurry of the extracted bark and extraction liquid from the lean cell and delivering it to the first-mentioned phase separator.

3. The method of extracting soluble components from the barks of trees with an aqueous extraction liquid selected from the group consisting of water and water extract of bark solubles which comprises continuously adding the bark material in comminuted form only to a final extraction cell containing rich extraction liquid in a system of countercurrent extraction cells separated by phase separators, adding an aqueous extraction liquid to the system in countercurrent flow to the solid material only in a phase-separating step where it is utilized as a wash liquid for the spent bark material, phase-separating the wash extraction liquid from the spent bark, continuously delivering the separated wash extraction liquid to a lean extraction cell as the primary extraction liquid of that cell, continuously recycling to the lean extraction cell as additional extraction liquid a proportioned part of the extraction liquid phase-separated from a slurry of the solid material and extraction liquid emanating from the lean cell, continuously delivering another proportioned part of said aqueous extraction liquid to another phase separator utilizing that portion as wash extraction liquid in a washing of the extracted solid material as the latter advances along on the last-mentioned phase separator to a point at which it is removed and delivered to the lean extraction cell, continuously collecting the wash extraction liquid, heating and delivering it to the rich extraction cell as the primary extraction liquid for that cell, intimately mixing the extraction liquid with the comminuted solid material in said rich cell while stirring the resulting slurry and maintaining it at a temperature of about the boiling point, continuously removing the slurry of solid material and extraction liquid from the rich extraction cell after a contact time of from 10'-30', phase-separating the extracted bark from the rich extraction liquid on the last-mentioned phase separator, continuously recycling a proportioned part of the separated rich extraction liquid to the rich extraction cell for mixing with further amounts of ground bark, collecting the remainder of the rich extraction liquid as final extract product, advancing the phase-separated extracted bark residue through the washing mentioned above countercurrently to the flow of washing liquid, removing the washed bark residue from the phase separator and delivering it to the lean extraction cell where it is contacted with a greater volume of extraction liquid than in the rich extraction cell and is maintained in intimate contact therewith at a temperature of about the boiling point for a longer period of time than in the rich extraction cell in the range of from 30'-120' while continually stirring the slurry, continuously removing a slurry of the extracted bark and aqueous extraction liquid from the lean cell and delivering it to the first mentioned phase separator.

4. The method of claim 3 wherein the aqueous extraction liquid added to the system is water.

5. The method of claim 4 in which the bark material is comminuted whole Douglas fir bark.

6. The method of claim 5 in which the temperature of extraction is maintained at approximately 100° C.

References Cited in the file of this patent

UNITED STATES PATENTS

| | | |
|---|---|---|
| 2,227,605 | Swallen et al. | Jan. 7, 1941 |
| 2,726,253 | Gastrock et al. | Dec. 6, 1955 |